United States Patent [19]

Bauer

[11] Patent Number: 5,697,496
[45] Date of Patent: Dec. 16, 1997

[54] PACKAGE FOR COMPACT DISKS OR COMPUTER DISKETTES

[75] Inventor: Chris Bauer, Nashville, Tenn.

[73] Assignee: McQueen, Inc., Nashville, Tenn.

[21] Appl. No.: 546,546

[22] Filed: Oct. 20, 1995

[51] Int. Cl.⁶ .................................... B65D 85/57
[52] U.S. Cl. .................. 206/308.1; 53/449; 206/308.3; 206/310
[58] Field of Search .................. 206/307, 308.1, 206/308.3, 309, 310–313, 387.1; 53/449, 452; 229/931

[56] References Cited

U.S. PATENT DOCUMENTS

| | | |
|---|---|---|
| 1,502,312 | 7/1924 | Mayhew . |
| 2,827,223 | 3/1958 | Allison ............................ 206/372 |
| 3,522,907 | 8/1970 | Utterback, Jr. ................. 206/312 |
| 3,556,391 | 1/1971 | Kosterka ......................... 229/68 |
| 3,949,873 | 4/1976 | Platt ................................ 206/311 |
| 4,176,744 | 12/1979 | Borzak ........................... 206/303 |
| 4,210,241 | 7/1980 | Morcom ......................... 229/931 |
| 4,327,831 | 5/1982 | Inaba et al. ..................... 206/310 |
| 4,535,888 | 8/1985 | Nusselder ....................... 206/444 |
| 4,623,062 | 11/1986 | Chase et al. .................... 206/4 |
| 4,635,792 | 1/1987 | Yamada et al. ................. 206/310 |
| 4,709,812 | 12/1987 | Kosterka ......................... 206/310 |
| 4,733,519 | 3/1988 | Harper et al. ................... 53/456 |
| 4,850,731 | 7/1989 | Youngs ........................... 402/79 |
| 5,042,230 | 8/1991 | Petersen ......................... 53/452 |
| 5,101,973 | 4/1992 | Martinez ........................ 206/312 |
| 5,186,327 | 2/1993 | McCafferty et al. ........... 206/313 |
| 5,188,229 | 2/1993 | Bernstein ....................... 206/312 |
| 5,236,081 | 8/1993 | Fitzsimmons et al. ......... 206/44 |
| 5,248,032 | 9/1993 | Sheu et al. ...................... 206/312 |
| 5,255,785 | 10/1993 | Mackey ........................... 206/444 |
| 5,284,242 | 2/1994 | Roth et al. ...................... 206/310 |
| 5,307,927 | 5/1994 | Curtis et al. .................... 206/323 |
| 5,332,089 | 7/1994 | Tillett et al. .................... 206/310 |
| 5,369,938 | 12/1994 | Panveno et al. ................ 53/456 |
| 5,372,253 | 12/1994 | O'Brien et al. ................. 206/312 |
| 5,377,825 | 1/1995 | Sykes et al. .................... 206/232 |
| 5,377,827 | 1/1995 | Roth et al. ...................... 206/310 |
| 5,402,882 | 4/1995 | Bandy et al. ................... 206/310 |
| 5,421,453 | 6/1995 | Harrer et al. ................... 206/312 |
| 5,460,265 | 10/1995 | Kiolbasa ......................... 206/312 |

FOREIGN PATENT DOCUMENTS

| | | |
|---|---|---|
| 1198208 | 2/1983 | Canada . |
| 0 159 860 | 4/1985 | European Pat. Off. . |
| 0 493 983 | 12/1991 | European Pat. Off. . |
| 1050913 | 1/1954 | France . |
| 3425579 | 7/1984 | Germany . |
| 41 07 218 | 3/1991 | Germany . |
| 8 702 565 | 5/1989 | Netherlands . |
| 2 135 274 | 2/1983 | United Kingdom . |
| 2 147 262 | 9/1983 | United Kingdom . |

*Primary Examiner*—Jimmy G. Foster
*Attorney, Agent, or Firm*—Lee, Mann, Smith, McWilliams, Sweeney & Ohlson

[57] ABSTRACT

A compact disk package made from a corrugated board insert attached to a panel of a foldable die-cut sleeve. The corrugated insert defines a CD-enclosing recess for accommodating a CD and a resilient hub joined to the CD in a resiliently disengageable manner. The package may be folded and sealed to closure to provide a lightweight, secure and environmentally agreeable package. The package allows for a variety of printable surfaces, pockets for the insertion of printed media, the packaging of a plurality of CD's, and forming tear-off panels for use as reply cards. The corrugated insert may be separately manufactured and provided with printable surfaces for later attachment to the die-cut sleeve. The invention includes the method of packaging compact disks, computer diskettes, and like flat articles, and the method of making the package therefor.

19 Claims, 9 Drawing Sheets

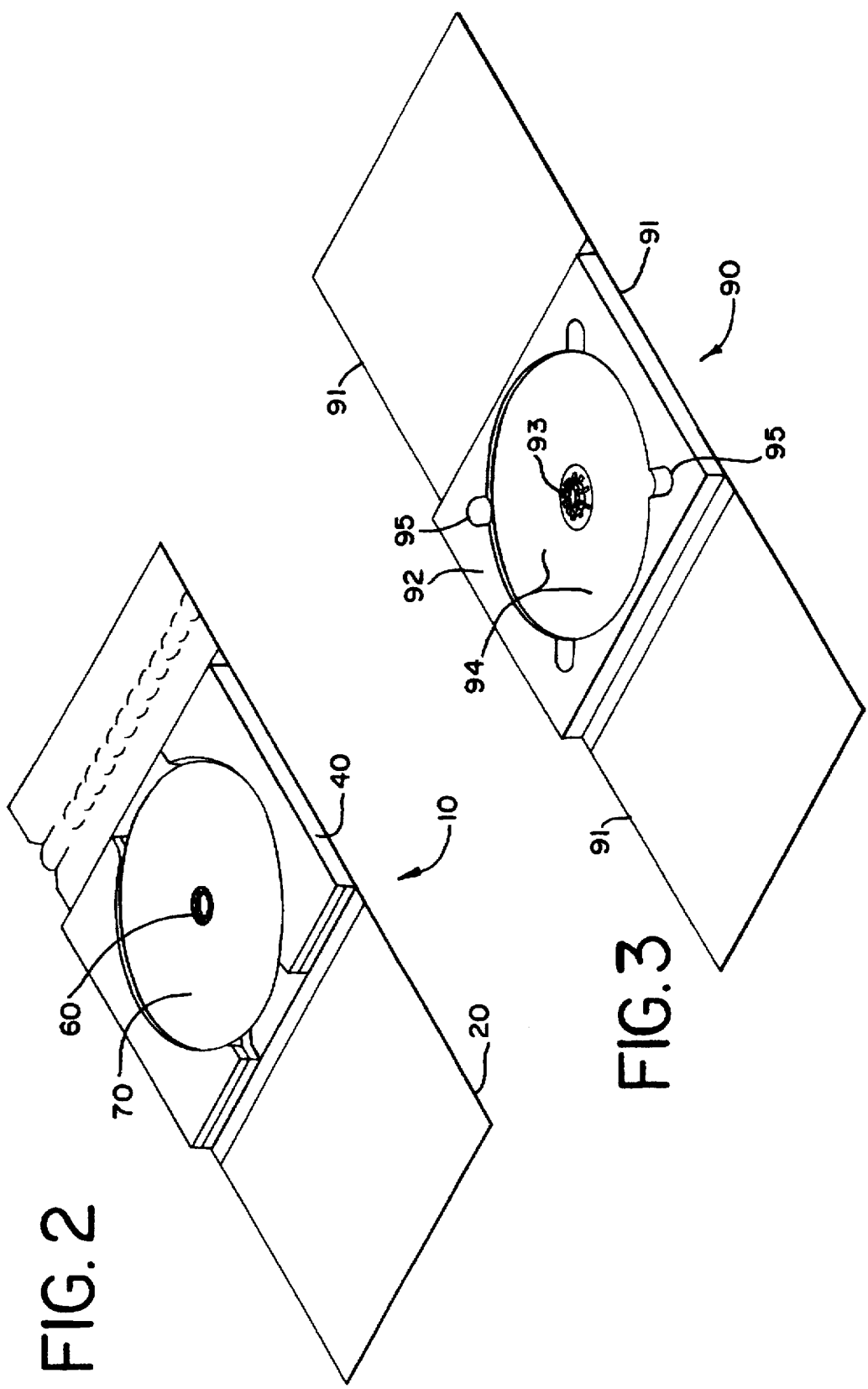

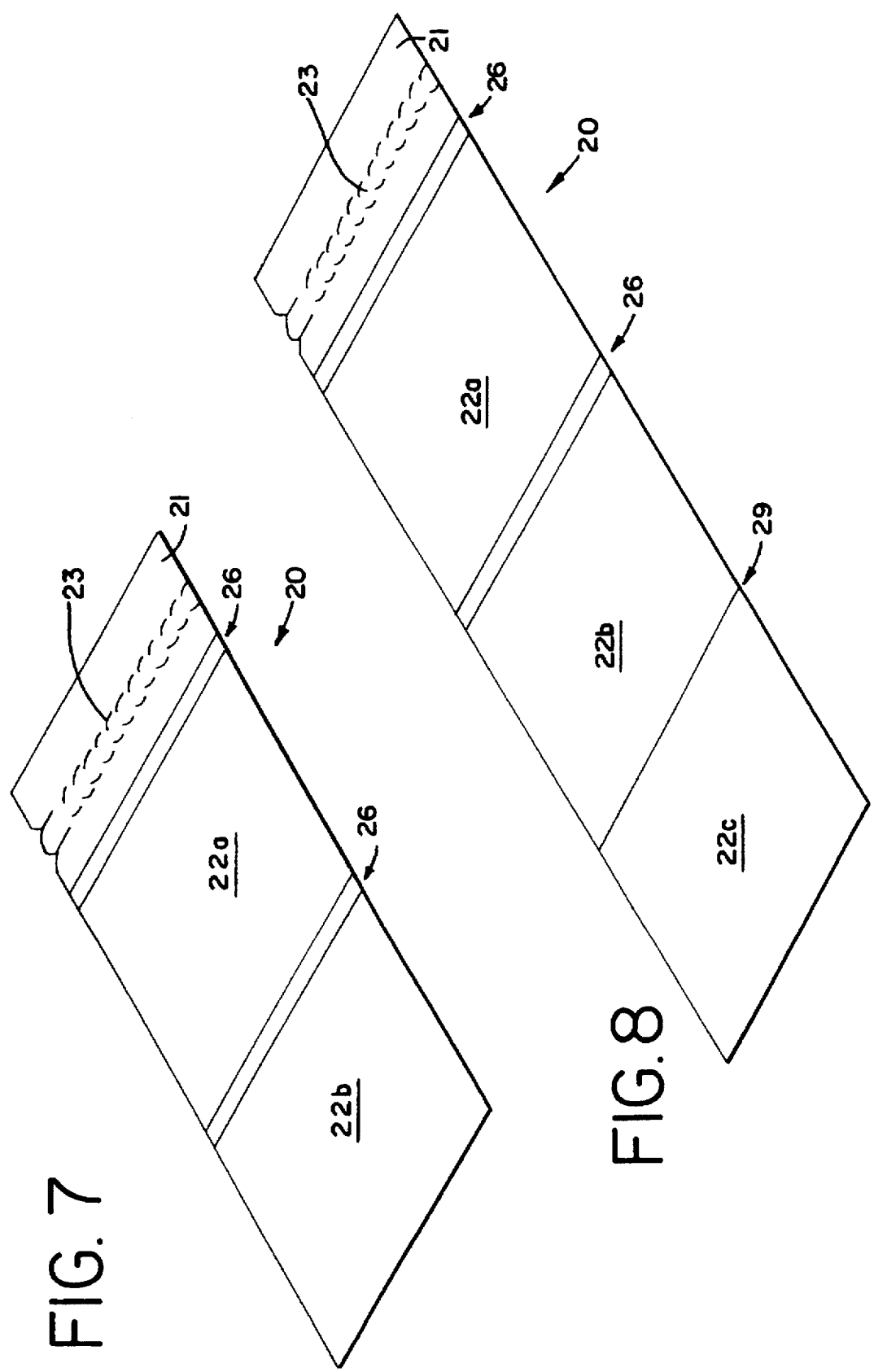

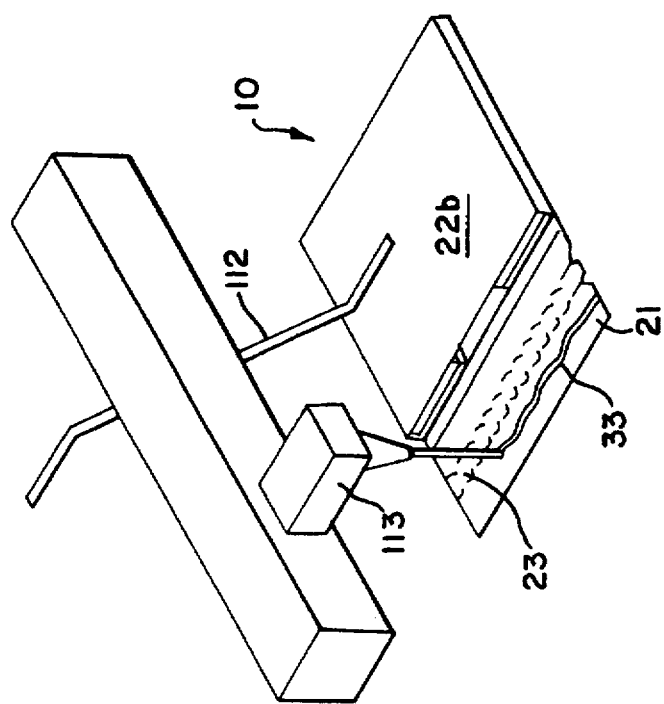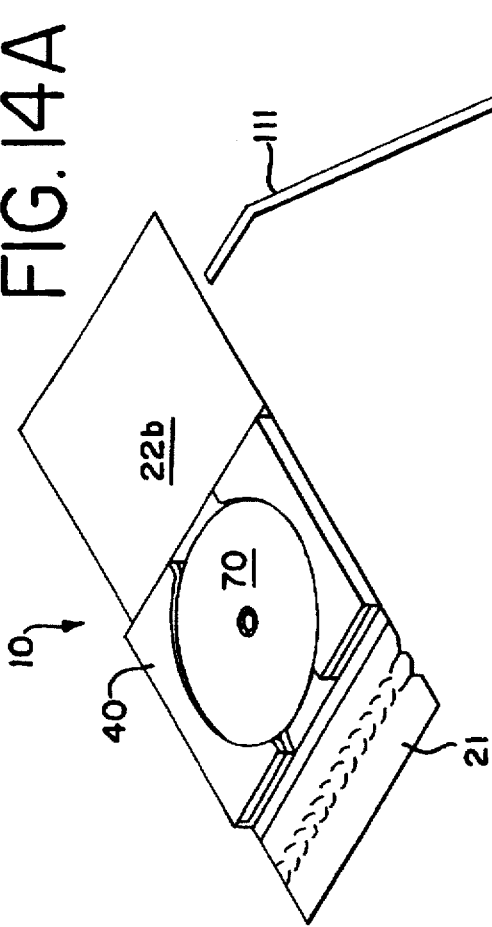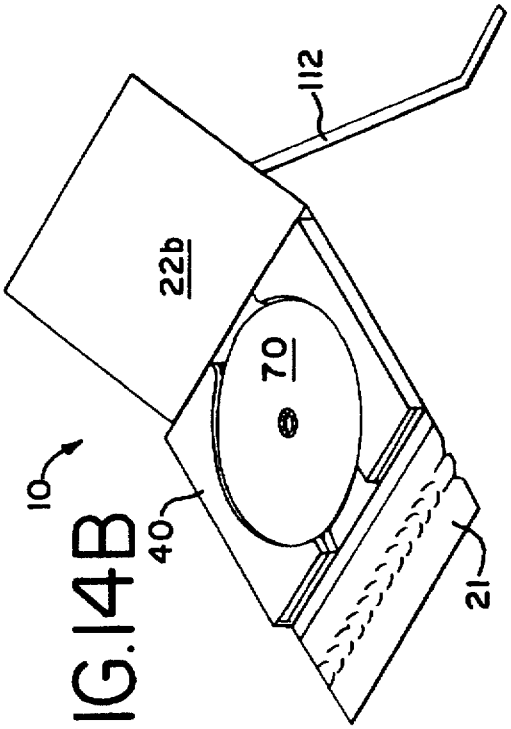

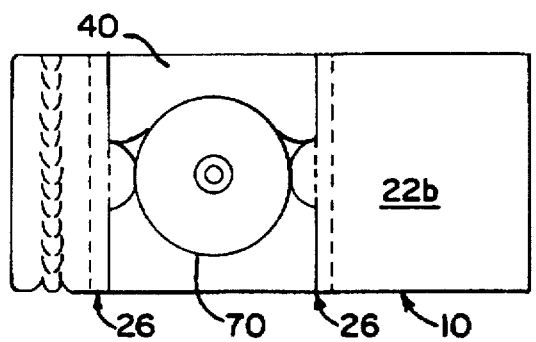
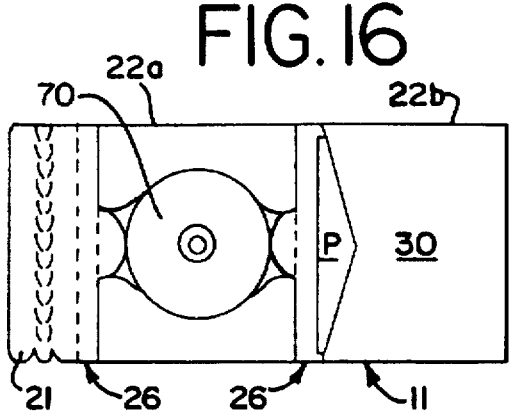
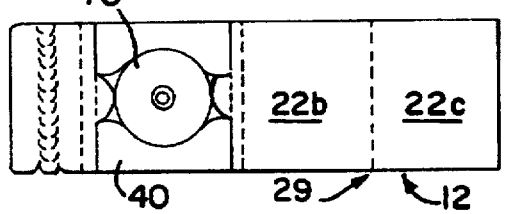
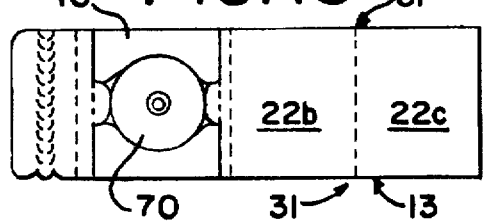
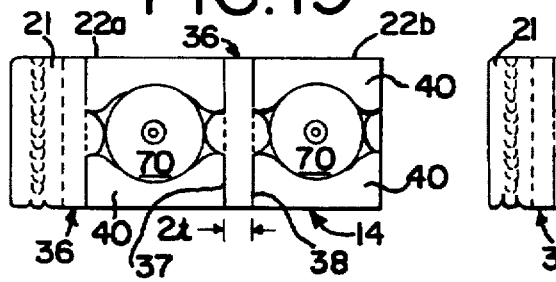
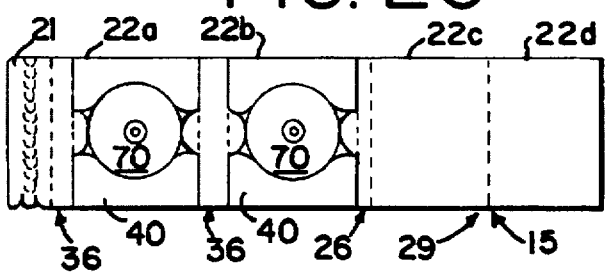
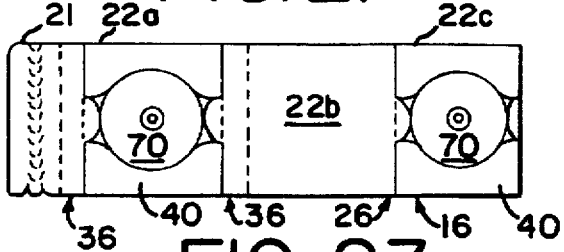
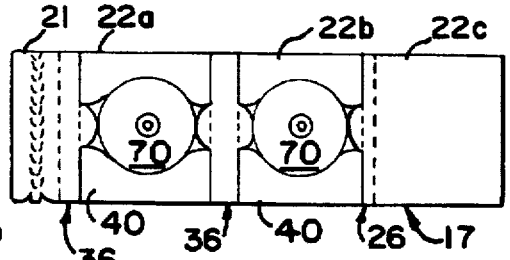
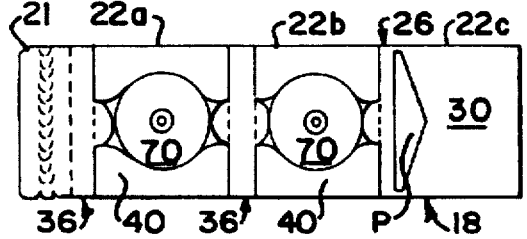
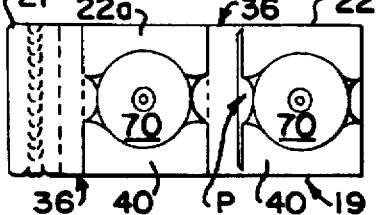

PACKAGE FOR COMPACT DISKS OR COMPUTER DISKETTES

BACKGROUND OF THE INVENTION

The invention generally relates to packaging, primarily for compact disks, commonly called "CD's", and alternately computer diskettes, cassettes, fax/modem cards, and the like.

With the wide proliferation of CD's, the manufacturers and sellers of this type of recording medium have sought a safe and secure package for a CD, while at the same time minimizing package weight in order to hold down shipping costs without sacrificing protection. CD's are laser readable and formed partly of metal and plastic. Although having the metallic component, they are nonetheless fragile and must be protected from scratching and bending. Publishers of music CD's would benefit from packaging that readily avails itself of printing with attractive graphics, allows for the insertion of printed media, provides an option for tear-off return mail cards, and makes possible the formation of insert sleeves to hold flyers, order forms, and the like.

The foregoing needs also exist in the packaging industry for computer diskettes and other related flat-like media articles, such as tape cassettes, computer fax/modem cards, and the like.

Others in the industry have provided packages for compact disks that comprise a molded plastic tray, such as is disclosed in U.S. Pat. No. 4,709,812. This package includes double-layered panel sections having an injection molded plastic tray on one section, like the type of tray found in the prior art "jewel box" packaging. Such trays have an integrally molded hub for resilient engagement with the center hole of the CD. Accordingly, the package disclosed in this patent requires the combination of a double-layered folded paperboard package with a tray made of injection molded plastic. The use of a plastic tray holder adds weight to a package, which might otherwise be avoided if a cellulose/wood pulp-based material were used for both the jacket and the disk holder. Additionally, it is not possible to print graphics, text, art work, or symbols on an injection molded disk tray. Decals or a modification of the mold for each different type CD would be needed.

Another double-layered foldable jacket for CD packaging is shown in U.S. Pat. No. 5,188,229, which package requires multiple folds and hinges by the folding of several pairs of panels onto each other. Some of the panels are joined by frangible connections to form a plurality of tear strips. One of the panels is cut out in the shape of a CD for the positioning of the CD therein. A panel of another pair has a plastic pintle for engaging the usual center hole of the CD. The pairs of panels are all formed of the same thickness and die cut to provide various openings and slots for folding. This package relies on preliminarily folding pairs of panels and adhering them to create double thickness paperboard sections that subsequently are folded. This envelope eliminates the use of tray-type monolithic structure around a CD. However, portions of sides of the CD may be exposed. An all-paperboard envelope may also be flimsy and allow harmful bending of the CD.

A utilization of a single layer cardboard folded construction, which avoids preliminary folds and double-layered sections, is shown in European Patent Application No. 0 493 983 A1, wherein two simple cardboard panels are hingedly joined. The face of one of the panels carries a resilient hub for engagement with a CD. A complete and secure three dimensional enclosure however is not attained. The circumferential edge of the CD is fully exposed along three sides of the package. Only along the hinge is the CD edge not exposed.

Accordingly, it would be desirable to provide an all-enclosing, recessed structural formation for a CD package, which weighs less than injection molded plastic to reduce mailing costs, but yet overcomes deficiencies in flimsy prior art paperboard constructions that may allow for a deleterious bending of the CD. It therefore would be advantageous to provide for a resilient engagement at the center hole of a CD and surroundingly protect it in a lightweight three dimensional construction, so that the package formed thereby would be mailable in a secure yet economical manner, and might alternately be useful as a retail sale package or includable in packaging by an original equipment manufacturer (OEM). It is therefore an additional objective to achieve a safe and secure construction wherein the material utilized for the package is almost entirely formed from cellulose/wood pulp paper-making techniques for producing paperboard and corrugated board in order to achieve a lightweight, durable construction, which avoids large plastic injection moldings and is environmentally conscious by being recyclable.

In connection with the foregoing objectives, it would also be a key target in providing the desired package to allow for numerous visually exposed surfaces to be printable, whereby both interiorly and exteriorly the package may bear graphics, text, logotypes, etc.

It is a further goal of the invention to provide a method of packaging a CD and a method for making a CD package that are efficient and involve a package made only of paper and corrugated board, except for a small plastic disk-engaging hub.

It is also a goal of the invention to provide a disk holder insert that is attachable to panels of a multi-panel single-layer sleeve or jacket, which includes the capability of self-centering the CD with a hub engaged to it during the packaging of the CD, so that the method for packaging is very efficient.

Further, it is another intention of the invention to provide a package for CD's, or like articles, that offers a variety of optional panel features, such as providing a tear-off return card panel, a pocket for pamphlets and the like, a plurality of printable panel surfaces for graphics and the capability of holding more than one CD.

Moreover, it would be significant in the media dissemination industry to provide a package meeting the above goals that also can be manufactured with alternate modifications in order to receive a rectilinear, or polygonally-shaped, or irregularly-shaped type of item, including a computer diskette, while still providing the foregoing benefits. For items without holes, like computer diskettes, a resilient hub would not be required.

Another result attained is the capability of protectively covering the top, the bottom and all lateral sides of the article secured within the holder insert of the invention.

An additional achievement of the inventive lightweight package is the resultant soft "cushioning" effect on the packaged article because the holder insert is made from corrugated board. This effect is not achieved by an injection molded hard plastic.

It is a concomitant object of the inventive method to provide for the preattachment of a resilient hub to a compact disk and thereby, in cooperation with disk-surrounding portions of the disk holder insert, effectuate the aforementioned self-centering of the compact disk within the disk holder insert.

Further aspects and benefits of the invention will be appreciated by those practicing the packaging arts.

SUMMARY OF THE INVENTION

The present invention is a package primarily for use as a mailer for compact disks. The package can be arranged to accommodate one or more compact disk holder inserts adhesively secured to panels of die-cut sleeves of paperboard. The disk holder insert comprises a corrugated board medium preferably having a white paper "printable" liner on one side thereof. The disk holder insert is hingedly folded to provide opposing disk-securing flaps, wherein by folding the flaps the paper liner is outwardly exposed to display or receive printing and the like thereon. The folding of the flaps of the disk holder insert creates a recess for accommodating a compact disk, or equivalently-shaped article. A resilient hub that is pre-engaged to a CD may be centrally adhered to the bottom of the recess in a self-centering motion. The die cut sleeve preferably has three or more panels, one of which may include a tear-open feature and the ability to be adhesively secured for closing the package. Others of the plurality of panels may be provided with: pockets containing additional media; a tear-away capability (for reply cards); graphics, indicia, art work, etc.; or, otherwise have an additional disk holder insert attached thereon. Thereby, the invention encompasses a variety of options for the enclosure of printed media, such as booklets, instruction sheets, reply cards, and the like, in combination with one or more compact disks and a plurality of printed surfaces.

The die cut sleeve may be printed on one or both sides. When the package is sealed, an exposed surface of the sleeve may receive an address, or other indicia, for example by ink jet printing.

The invention also encompasses a method for manufacturing the disk holder insert and the die cut sleeve for subsequent marriage to each other to provide a package ready for printing and the enclosure of one or more compact disks, plus any advertising, promotional, or instructional printed media to be packaged therein.

The invention additionally provides for the method of packaging a compact disk by the self-centering introduction of the compact disk and an engaged resilient hub into a recess of a corrugated compact disk holder insert. A full enclosing of the compact disk is achieved by the folding and sealing of panels of a die cut sleeve or jacket closing around the disk holder insert. An adhesive securement of a panel having a tear-open feature seals the package.

BRIEF DESCRIPTION OF THE DRAWINGS

FIG. 2 shows the package of FIG. 1 in perspective view wherein the package is assembled with a compact disk therein ready for closure;

FIG. 3 illustrates a prior art package utilizing an injection molded tray for a compact disk package;

FIG. 7 illustrates the basic three panel die cut sleeve of the package, as in FIG. 2, prior to the attachment of the compact disk holder insert, as in FIG. 5;

FIG. 8 shows a four panel die cut sleeve in an optional alternative to the basic package;

FIGS. 14A–C show steps of folding a panel over the compact disk and placement of adhesive on the tear-panel for the subsequent sealing closure of the basic package of the invention in accordance with the schematic illustration of FIG. 12;

FIGS. 15–24 show the basic package and nine optional alternatives of the inventive package in plan views having one or two compact disk holder inserts—shown shaded— retaining compact disks, wherein:

FIG. 15 is the basic package shown in FIG. 2 having three panels;

FIG. 16 shows a three panel package having a pocket as shown in FIG. 11;

FIG. 17 illustrates a four panel package;

FIG. 18 shows a four panel package wherein the fourth panel is a removable tear-off panel;

FIG. 19 shows a three panel package having two adjacent compact disk holder inserts retaining two compact disks;

FIG. 20 is a five panel package having two adjacent compact disk holder inserts for retaining compact disks;

FIG. 21 is a four panel package having two compact disk holder inserts being separated by a panel and each holding a compact disk;

FIG. 22 shows a four panel package having two adjacent compact disk holder inserts and each holding a compact disk;

FIG. 23 shows a four panel package wherein an end panel includes a pocket and having two adjacent compact disk holder inserts each holding a compact disk therein; and FIG. 24 shows a three panel package having two adjacent compact disk holder inserts holding compact disks therein wherein one of the panels further includes a pocket behind the compact disk holder insert for inserting a pamphlet or the like.

DETAILED DESCRIPTION OF THE INVENTION

Figure 1:
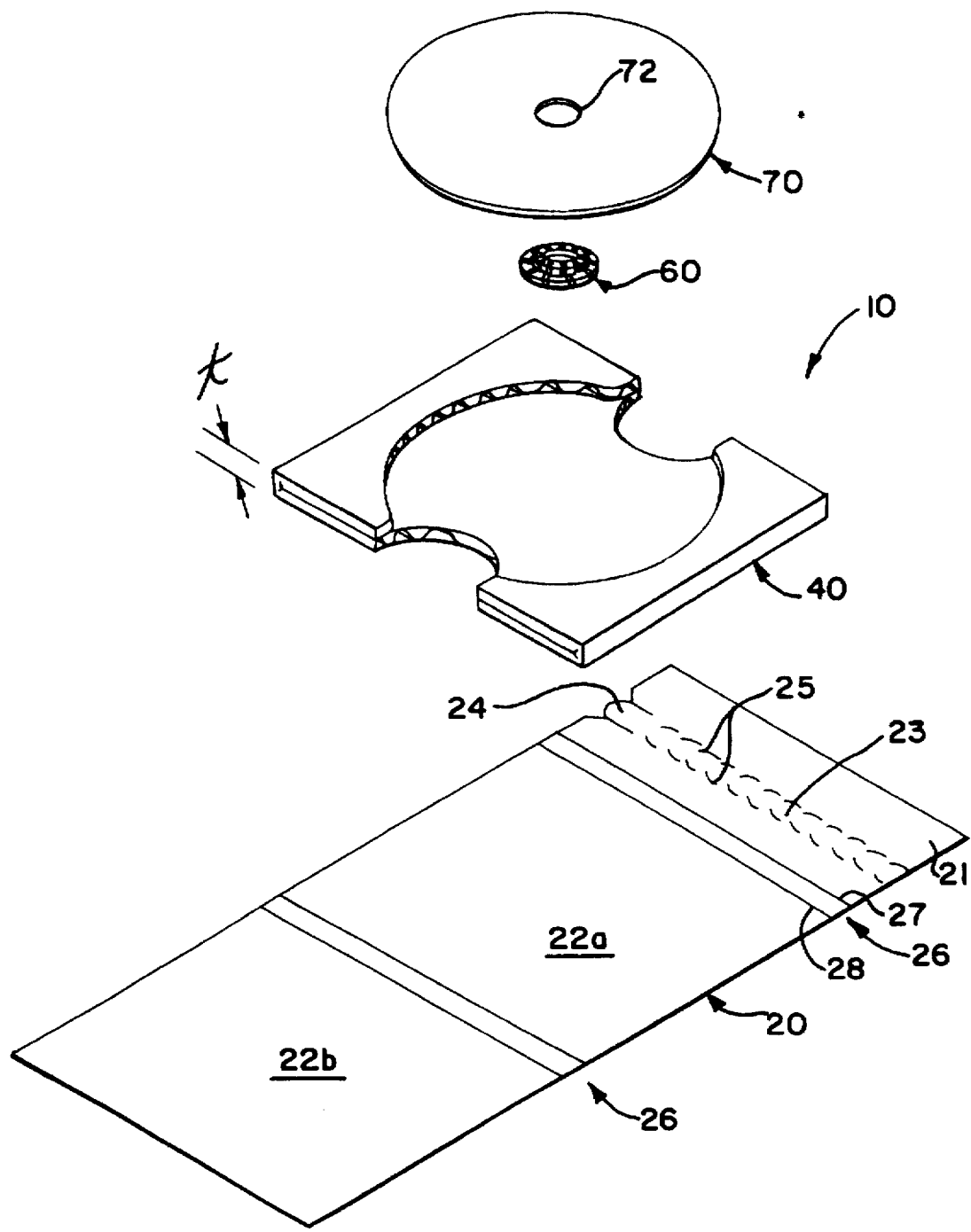
FIG. 1 is an exploded perspective view of the basic package for a compact disk mailer made according to the invention.

In the Figures, like reference numerals indicate the same elements throughout. Reference numerals 10–19 denote the basic package and nine exemplary optional alternatives for the package. Reference numerals in the range 20–39 refer to the die cut jacket for the package. Reference numerals in the range 40–59 refer to the disk holder insert. Reference numerals in the range 60–69 refer to the resilient hub for engaging the central hole of a compact disk. Reference numerals in the range 70–79 refer to the compact disk. Reference numerals 90–95 refer to a prior art CD package shown in FIG. 3. Reference numerals in the range 100–120 refer to the assembly line of FIG. 12.

In greater detail, with reference first directed to FIGS. 1 and 2, a basic package 10 embodying the invention is illustrated. The package 10 comprises a die cut sleeve 20. A sleeve is also sometimes referred to as a "jacket" or "blank" in the industry reflecting its ability to be folded or bent for enclosing media articles or printed materials. A disk holder insert 40 is shown in an exploded arrangement above the sleeve 20 and is constructed for the receipt therein of a compact disk. Next, shown spaced upwardly from the holder insert 40, is a resilient hub 60 for engagement with a CD 70 located thereabove. The assembled package 10, with CD 70 therein, is shown in FIG. 2 in a condition prior to folding the die cut sleeve 20 to enclose the CD 70 within the holder insert 40.

FIG. 3 illustrates a previously known package 90 generally sold under the trademark DIGIPAK and disclosed in said U.S. Pat. No. 4,709,812. This package 90 has three panels 91 with one of the panels carrying an injection molded disk tray 92. The disk tray 92 includes an integrally molded hub 93 at the base of a well 94 having peripheral finger holes to facilitate removal of a CD when engaged therein. The panels 91 are double-layered hinged board sections that are prefolded and adhesively secured together and subsequently folded to enclose the plastic tray 92.

With continuing reference to FIGS. 1 and 2, the components of package 10 will be explained in greater detail. For ease of reference, and to avoid using several numbers for elements that have the same dimensions and properties in each of the embodiments, it will be understood that the packages 10–19, as further described herein, have a plurality of panels, each including a mar panel 21 and one or more panels 22a, b, etc. The panels 22a, b, etc., are all identically shaped rectangles being attached along at least one edge to another panel at hinged connections. In the preferred and alternate embodiments the hinge connections are among the following: a scored parallel line hinge (26) having a width substantially equal to the thickness of the disk holder insert 40; a scored parallel line hinge (36) having a width substantially equal to even multiples of the thickness of the disk holder insert 40; a single line hinge (29) formed by scoring a line across the sleeve 20; or, a line of die cut slits through the sleeve 20 forming a hinged line of separation (31), such as for use when an end panel is intended to be a tear-off reply card for a package.

More specifically, the die cut sleeve 20 in FIG. 1 has a tear panel 21 with a tear-off strip 23 having a pull tab 24 created by a parallel set of slits 25 cut through the sleeve 20, whereby the strip 23 may be torn away from the panel 21 to open the package 10 as will be explained in more detail below. The tear panel 21 is joined to a panel 22a at a hinge strip 26 defined by parallel score lines 27 and 28 that are spaced apart a distance substantially equal to the thickness t of the disk holder insert 40. The panel 22a is joined to panel 22b at another hinge 26 formed identically to the hinge 26 between the panels 21 and 22a. The score lines 27 and 28 of the hinges 26 facilitate the folding of the panels, as explained in greater detail below.

The die cut sleeves 20 are preferably made of 12 pt. C2S (coated two sides) paperboard stock. The paperboard has a glossy white coating on both sides in the illustrated embodiment allowing for printed indicia, graphics, etc., to be applied on any chosen surface and further allowing for the package 10 to be addressed or coded by means of, for example, ink jet printing after the package has been sealed closed.

With focus on FIGS. 1, 4 and 5, the structure of the compact disk holder insert 40 will be explained. The holder insert 40 is die cut from standard corrugated board. In the preferred embodiment, the corrugated board is a #200 C-Flute. This type of board has S-shaped corrugations 41 formed from Kraft paper pulp in a standard process to have overlying and underlying paper layers 42 and 43 shown peeled away from the corrugation 41 at the righthand side of FIG. 4. In order to give the holder insert 40 a printable surface, one face is covered with a thin Kraft paper layer 44. In the disclosed embodiment, the exterior surface of the paper layer 42 has the paper layer 44 bonded thereto. The paper layer 44 of the disclosed embodiment is colored oyster white. The material for the insert holder 40 is a common type of corrugated board. In the paper packaging industry the corrugated board elements 41, 42 and 43 are sometimes called the "medium" and the oyster white paper layer 44 is called the "liner." The medium and liner are collectively known as corrugated board.

Figure 4:
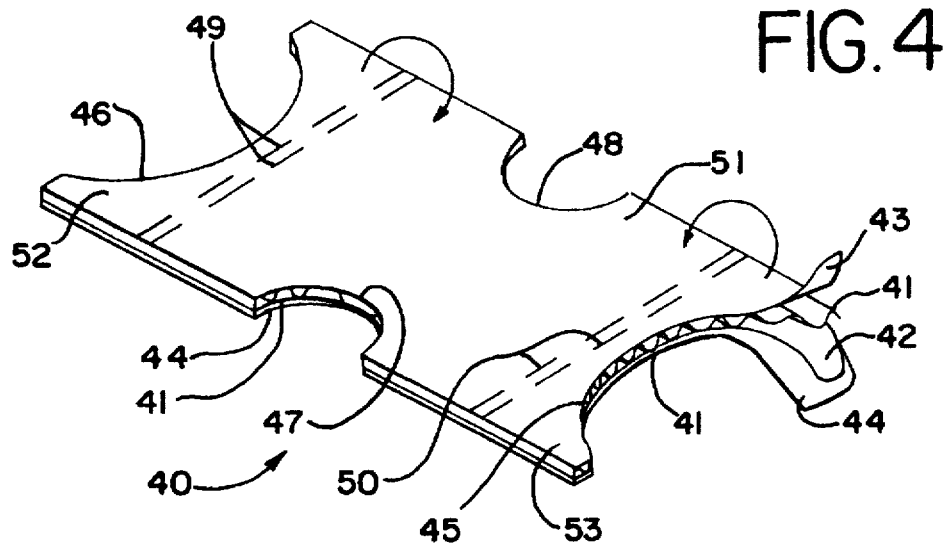
FIG. 4 shows a stage in the formation of a compact disk holder insert for the inventive package, as shown in FIG. 2.

The holder insert 40, is formed by die cutting corrugated board to a rectangular shape, as shown in FIG. 4, and die-cutting matching large crescent-shaped cuts 45 and 46 from both opposite shorter edges of the rectangular shape. The longer sides of the rectangular shape are also die cut to provide smaller crescent-shaped curvilinear cuts, which are shown as semi-circular cut outs 47 and 48 that are outwardly concave at mirror-image corresponding locations along each of the longer side edges of the rectangular shape. The corrugated board is then slit therethrough at spaced-apart parallel double rows of slits 49, 50 to define a base section 51 therebetween and flaps 52,53 at either side. These slits 49, 50 also define side edges of the holder insert 40 when the flaps 52,53 are folded atop the base section 51 to achieve the arrangement shown in FIG. 5. In the preferred embodiment, the spacing between the double rows of slits 49, 50 is substantially equal to the width of panels 22a,b,etc., so that the holder insert 40 may be placed on a panel to span the full panel width. In the disclosed embodiments, the panels 22a,b,etc., are equal-sized squares and the holder insert 40 is square and coincident with the panels 22a,b,etc., whereby the holder insert 40 will completely cover any of the panels 22a, b, etc. to which it could be affixed. The invention however is not limited to configurations wherein the dimensions of the panels and insert holders are coincident.

The flaps 52, 53 are folded over and adhesively attached to the base section 51. Thereby, the cut outs 45, 46 opposingly face. In the exemplary embodiment, the cut outs 45, 46 are die cut to have equal radii, which in turn are slightly greater than the predetermined radius of the CD 70. The flaps 52,53 have opposing ears 54,55 at one side and opposing ears 56,57 at the other side of the holder insert 40. The ears 52–55 in the preferred embodiment terminate substantially at the cut outs 47,48 and therefore do not project into a space thereby created for the insertion of the user's finger to remove a CD 70. It is further seen in FIG. 5 that the cut outs 47,48 are diametrically positioned across the generally circular recess 58 formed by the base section 51 and the curved cut outs 45, 46 of the flaps 52, 53. The cut outs 47, 48 are generally transversly arranged relative to the cut outs 45, 46.

Figure 5:
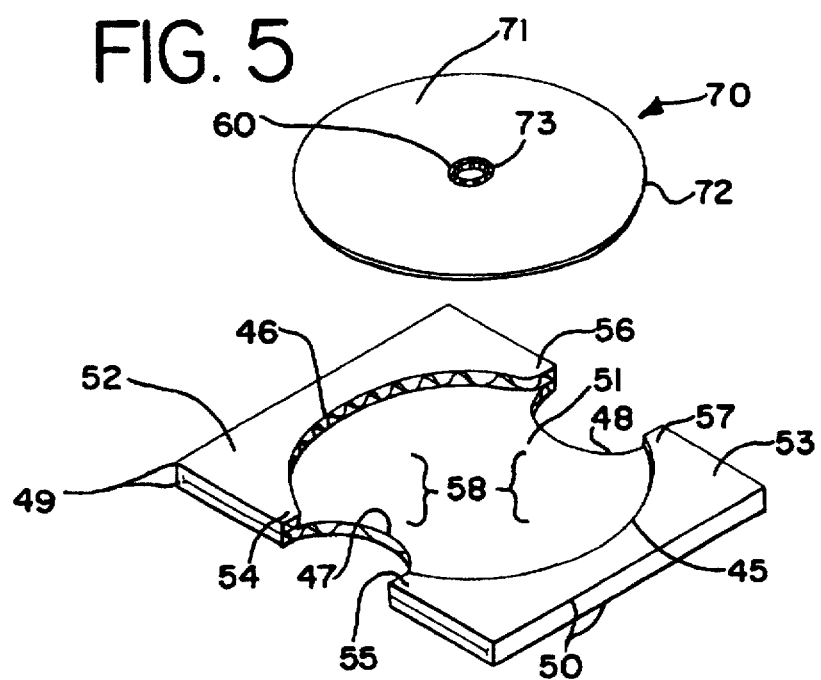
FIG. 5 illustrates the completed compact disk holder insert subsequent to the stage in FIG. 4 and ready for receipt of a compact disk shown thereabove for placement into a recess of the holder insert.
Figure 6:
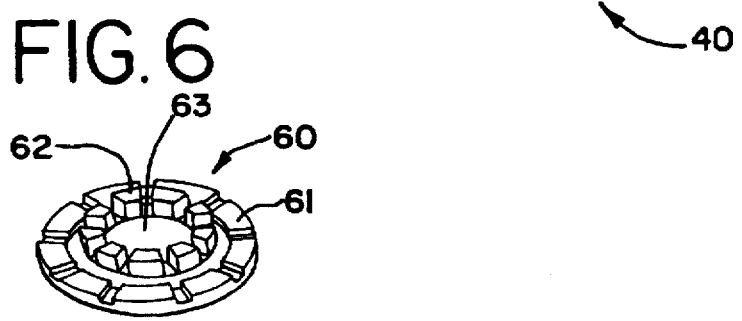
FIG. 6 is an enlarged perspective view of a resilient hub attachable at the center hole of a compact disk as in FIG. 5.

With attention directed to FIGS. 1, 5 and 6, the connection of the resilient hub 60 with the CD 70 will be more clearly understood. In the exemplary embodiment, the resilient hub 60 is molded from high impact polystyrene (HIPS) to have a notched base 61 and resilient fingers 62 arranged in a circular fashion and set inwardly of the notched base 61. The fingers 62 are resiliently snap-engageable with the circumferential edge of a center hole of a CD to flex inwardly during engagement and remain in a tensed resilient engagement with the CD until removed. The fingers 62 are circumferentially spaced around an interior surface 63 of the base 61 and wherein the undersurfaces of the base 61 and the central portions 63 are flat for adhesive engagement onto the base section 51 of the holder insert 40.

The CD 70 shown generally throughout the Figures and particularly in FIGS. 1 and 5 comprises a laser readable metallic plate 71, which in the industry is formed to have a predetermined radius of about 2.35" and defining a circumferential periphery 72 that fits between the cut outs 45,46 of the holder insert 40. A central hole 73 is formed through the CD 70 in the usual fashion and the resilient hub 60 is shaped to have its fingers 62 resiliently engaged therein as explained above. In FIG. 5, the hub 60 is shown engaged to the CD 70. Thereby, the CD 70 and the hub 60 will be understood as being adapted to be preassembled for subsequent placement within the recess 58 of the disk holder insert 40 formed between the cut outs 45,46 and underlying base section 51. The base section 51 thereby forming a bottom wall for a substantial portion of the recess 58. Accordingly, the combined thicknesses of the corrugated board 41-43 and paper layer 44 are preferably no less than the combined thicknesses of the CD 70 and base 61 of the hub 60, whereby the CD 70 may reside fully within the recess 58 with no portions thereof extending upwardly above or past the flaps 52,53.

FIGS. 7-10 provide the basic and three optional alternates for the construction of the die-cut sleeve 20. FIG. 7 repeats the representation of the die-cut sleeve 20 for the basic package 10, as shown in FIG. 1, but is showed here alone. In FIG. 8, an additional panel 22c is provided for a package and is joined to the panel 22b at a single score line hinged construction 27. This embodiment allows for an additional printing surface at panel 22c whereby, for example, the holder insert 40 might be attached to the panel 22a and printed indicia, graphics, advertising, artistic representations, and the like, might be provided at the printable surfaces on the panels 22b and 22c. In this way, during closure the panel 22c would be rotated about the hinge 27 to fold onto the panel 22b and then both would be rotated at the hinge 26 between the panels 22a and 22b to fold onto the panel 22a and any insert holder 40 mounted thereon. Thereafter, using the hinge 26 between the panel 21 and the panel 22a, the panel 21 would be rotated to fold atop the others and then adhesively sealed against the back surface of the panel 22c.

Figure 9:
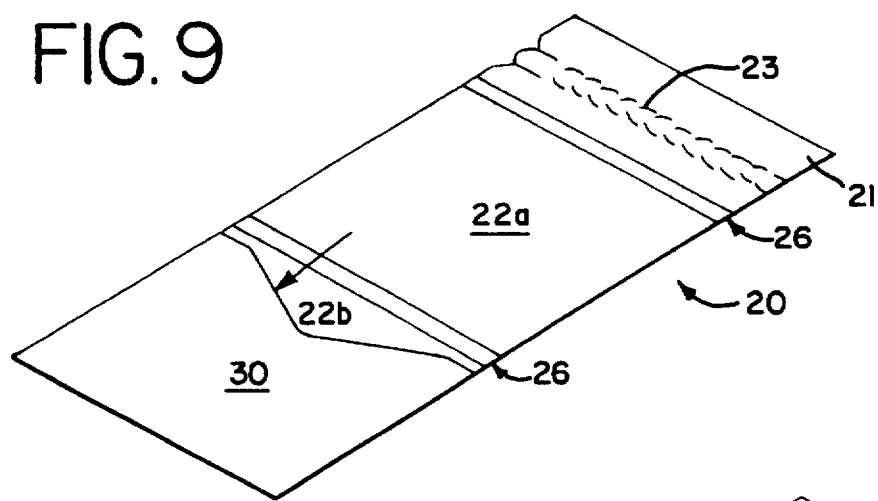
FIG. 9 shows another alternate embodiment of a three panel die cut sleeve including a pocket.

The die-cut sleeve 20 in FIG. 9 is substantially identical to that of FIG. 1 with the addition of a pocket panel 30 marginally adhered along three sides to the panel 22b to form a pocket for the insertion of loose media such as booklets, flyers, reply cards, etc. as indicated by the arrow.

Figure 10:
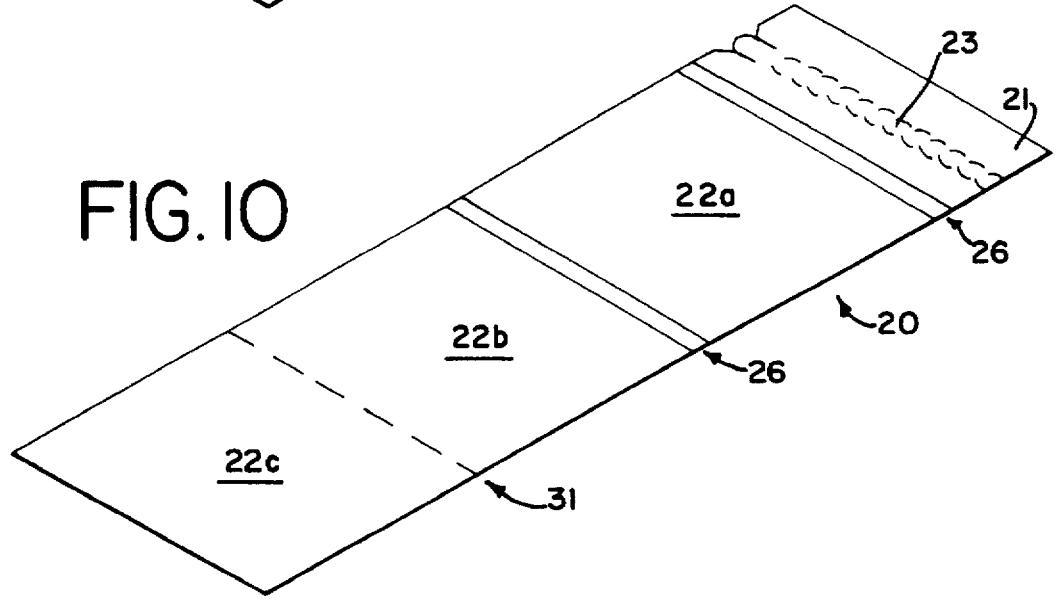
FIG. 10 shows another alternate embodiment of a four panel die cut sleeve having a tear-off panel.

The embodiment for the die-cut sleeve 20 shown in FIG. 10 is similar to that of FIG. 8, except that in place of the score line 29, a die cut line of slits 21 is provided, whereby the panel 22c may be torn away from the panel 22b. This tear-off feature is desirable when the seller/publisher wishes to induce the consumer to send a reply card back. The die-cut line of slits 31 also facilitates the hinging of the panel 22c to fold onto the panel 22b in substantially the same way as provided by the score line 29 of the embodiment in FIG. 8.

Figure 11:
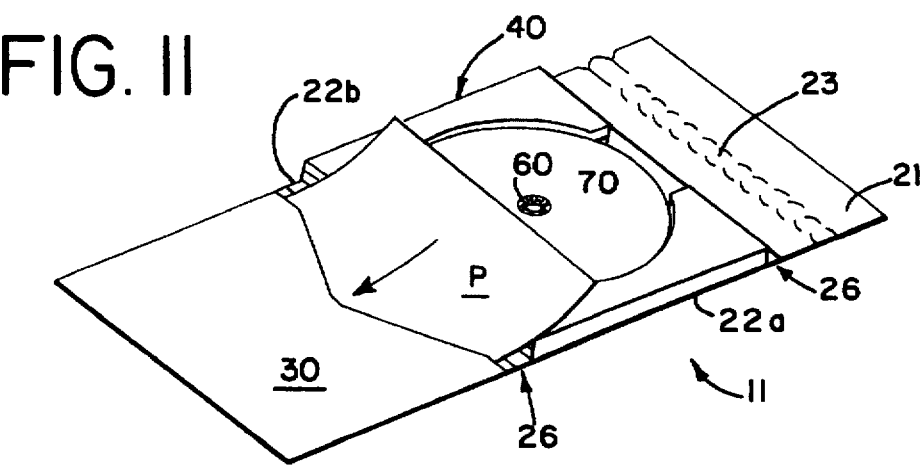
FIG. 11 illustrates the assembled package of the alternative embodiment shown in FIG. 9 having the compact disk holder insert retaining a compact disk and the pocket in the process of receiving a pamphlet.

FIG. 11 illustrates a package 11 formed utilizing the die-cut sleeve 20 of FIG. 9 in an alternate construction made in accordance with the invention. In the package 11, the panel 30 forms the pocket for the insertion of a pamphlet P between the panel 30 and the panel 22b. The panel 22a has the holder insert 40 affixed to it with a CD 70 retained on a resilient hub 60, which hub 60 is secured to the base 51 of the holder insert 40. The closure of the package 11 is achieved by first fully inserting the pamphlet P into the pocket and thereafter (1) folding the mated panels 22b/30 about the hinge 26 to fold over the insert holder 40 and (2) finally pivoting the tear panel 21 about its respective hinge 26 to fold over the panel 22b/30. The method of packaging a compact disk 70 will be further explained below.

METHODS

The invention encompasses methods for (1) packaging compact disks and other articles, and (2) making packages.

Figure 12:
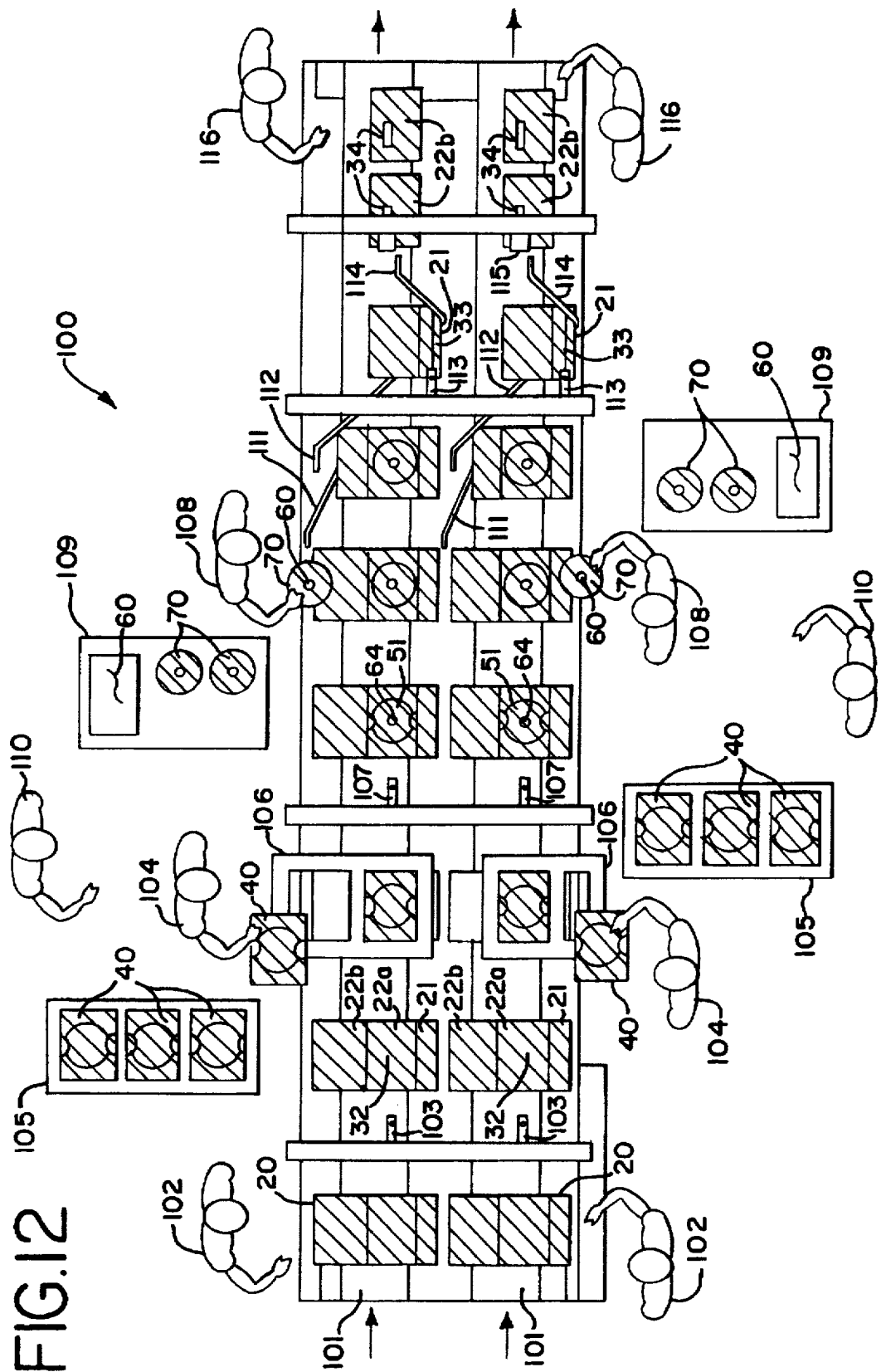
FIG. 12 is a schematic plan view illustrating the assembly line packaging of a compact disk for the basic package of the invention.

FIG. 12 illustrates in a plan schematic view, two parallel assembly paths for packaging CD's in packages of the type comprising the package 10 shown in FIG. 2 of the preferred embodiment. The present invention envisions making packages that may be used as mailers, as retail store packaging or for original equipment manufacturer (OEM) use. The exemplary embodiment shown in FIG. 12 for the packaging method for a mailer includes the steps of inserting the hubs 60 into the CD's 70 and the placement of the CD's 70 into the packages 10 for subsequent folding, sealing closure, and the ink jet printing of the address of the recipient.

More specifically, the method for packaging the CD 70 in the package 10 for mailing is accomplished in the exemplary embodiment by an assembly line 100 having two parallel belt-type conveyors 101. The assembly line 100 will be understood as providing two mirror image lines and substantially simultaneous steps and activation of devices along both conveyors 101. The flat sleeves 20 are individually placed manually by loaders 102 onto the conveyors 101. The conveyors 101 take the sleeves 20 under glue heads 103 which apply drops of glue 32 on the panels 22a. The glue is provided for adhering the disk holder inserts 40 to the panels 22a and is a pressure sensitive adhesive facilitating the removal of the corrugated board medium and paper liner comprising the holder inserts 40 for easy recycling. Handlers 104 remove pre-glued holder inserts 40 from hopper carts 105 and place them into jig fixtures 106. The conveyors 101 transport the sleeves 20 under the jig fixtures 106 which enables the holder inserts 40 to be precisely placed in the correct locations onto the panels 22a.

The sleeves 20 and adhered holder inserts 40 are then conveyed under a second glue head 107 which applies a small spot of glue 64 generally centrally located on the base section 51 of the holder inserts 40 in order to subsequently affix the hubs 60 thereat. In the preferred embodiment, the glue used to adhere the hubs 60 to the corrugated holder insert 40 is a hot melt animal glue creating a permanent bond. Optionally, the area around the spot where the dot of glue 64 is placed may be perforated to facilitate removing the HIP hubs 60 for recycling separate from the paper and corrugated board.

Hub inserters and CD placers 108 manually insert the hubs 60 into the center holes of the CD's 70 and then place the CD/hub combination into the recesses 58 of the holder inserts 40, as generally depicted in FIG. 5. A hopper cart 109 holds the hub 60 and the CD's 70 ready for this assembly step. Material handlers 110 bring fully loaded carts 105 and 109 to the assembly line 100 as needed. They may also assist in the engagements of the hubs 50 to the CD's 70.

The step of placing the CD's 70 with attached hub 60 involves a self-centering motion caused by the opposing cut outs 46, 45, which guidingly help center the CD within the recesses 58 and thus secure the hubs 60 to the glue dots 64 on the base sections 51. Thereby the method eliminates the need for another jig fixture for placing the CD's correctly into the holder inserts 40.

Figure 13B:
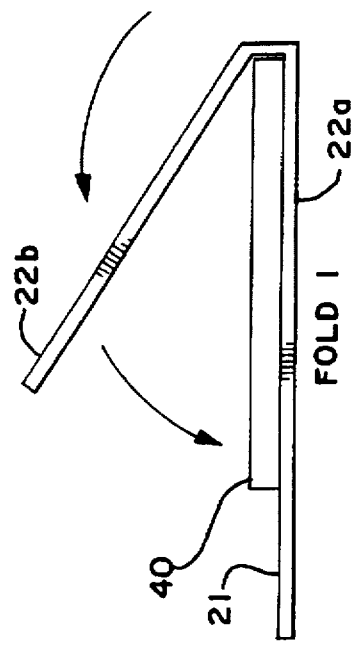
FIGS. 13A–D show the steps of folding closed and sealing of the basic package in accordance with the schematic illustration shown in FIG. 12.
Figure 13A:
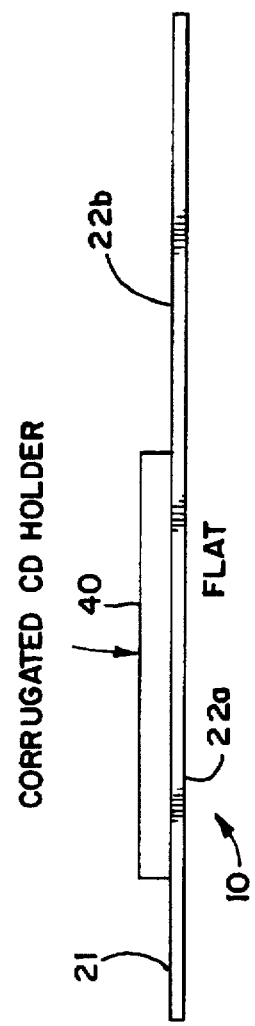
Figure 13D:
Figure 13C:
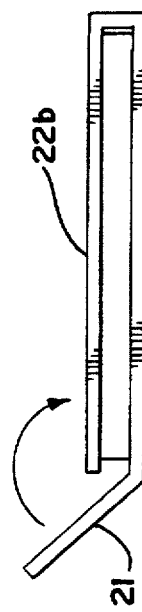

Each package 10 with the CD 70 is now ready to be folded, sealed and then addressed. These steps are accomplished by conveying each package 10 to pipe benders 111 and 112. FIGS. 13A, 13B, 14A and 14B illustrate the 180° folding of the panel 22b from a flat condition to ultimately fold onto the holder insert 40. The package 10 thereby achieves the arrangement as shown in FIG. 14C and is then passed under a third, or final, glue-head 113, which lays down a bead of glue 33 on the tear panel 21 outwardly of the tear strip 23. Then, the package 10 with the CD 70 inside travels along the conveyor 101 to a final pipe bender 114 which folds the tear panel 21 180° over and onto the exposed side of the panel 22b, as further illustrated in FIGS. 13C and 13D. The package 10 is thereby sealed when the adhesive 33 affixes the tear panel 21 to the panel 22b.

The packages 10 then are conveyed to ink jet printing heads 115 which address and/or code the packages 10 on the panels 22b. The sealed closed packages 10 are then removed from the conveyors 101 by unloaders 116 for shipment.

While the foregoing assembly line 100 is shown employing manual labor, particularly the insert placers 104 and the hub inserters and CD placers 108, the method could be totally automated by using known "pick and place" technology.

The invention also includes the methods of making the holder inserts 40 and affixing them to the die-cut sleeves 20 to create the packages 10 and the alternate packages 11–19 shown in FIGS. 15–24, as explained in the foregoing with respect to FIGS. 1–12.

ALTERNATE EMBODIMENTS

The basic package 10 is re-illustrated at FIG. 15 for purposes for understanding its features compared to those of the other optional alternatives shown in the FIGS. 16–24. Likewise, FIG. 16 re-illustrates the package 11 with the panel 30 creating a pocket for an insert pamphlet P, as discussed above in regard to FIG. 11.

In FIGS. 15–24 the holder inserts 40 and the CD's 70 are shaded to better distinguish them from the sleeves 20. In FIG. 17, the package 12 utilizes the die-cut sleeve 20 as shown in FIG. 8 wherein the panels 22b and 22c are joined by a single hinge line 29. In this way, the panel 22c is to be folded onto the panel 22b and then both together are folded over the CD 70 and the holder insert 40. In FIG. 18, the package 13 utilizes the die-cut sleeve as shown in FIG. 10 wherein the panels 22b and 22c are joined by a slitted hinge line 31 enabling the panel 22c to be a tear-off reply card.

The remaining FIGS. 19–24 illustrate ways in which the invention may provide a plurality of packaged CD's 70 and holder inserts 40. In FIG. 19, two CD's 70 and holder inserts 40 are shown at each of two panels. The die-cut sleeve for this package 14 is similar to that for package 10, except that the hinges 26 of package 10 are changed to be hinges 36, as shown, having a width 2t between score lines 36 and 37 in order to accommodate the double thickness of the insert holders 40. The thickness t is indicated in FIG. 1 in regard to the folded-over corrugated board forming the holder insert 40. In this way, the panel 22b may be folded onto the panel 22a and then the package finally sealed by adhering the tear panel 21 onto the panel 22b as explained in regard to the assembly line 100.

FIG. 20 shows a package 15 in a five panel arrangement providing panels 21 and 22a–d. The panels 22c and 22d may be provided with graphics, printed indicia, art work or the like, which affords the seller/publisher greater surface areas to print upon. The joinder of the panels 22c and 22d is a hinge 29 as in the package 12 of FIG. 17. Optionally, a slitted hinge 31 might be substituted there for making the panel 22d a tear-off reply card, or the like. Similar to FIG. 19, the panels 22a and 22b are joined by a hinge 36. The tear panel 21 is joined to the panel 22a by a hinge 36 facilitating the closure of the double CD arrangement. To close the package 15, the panel 22d would be folded to the left on top of the panel 22c and then both of them folded at hinge 26 onto the panel 22b. Then, the panel 22a would be folded onto the assembled panels 22b–d and ultimately the tear panel 21 would be folded and sealed thereover.

FIG. 21 illustrates another double CD at package 16. The package 16 is a four panel package comprising panels 21 and 22a–c. The panels 22a and 22b are joined by a hinge structure 36 and the panels 22b and 22c are joined by the hinge structure 26. In closing this package 16, the panel 22c is rotated about the hinge 26 to close over the panel 22b and then the panel 22a is folded atop 22b and 22c. Next the tear panel 21 is pivoted at hinge 36 to fold against the back of the panel 22c and adhered thereon for sealing the package 16 closed.

In FIG. 22, a package 17 is disclosed which is similar to the package 16 and includes four panels 21 and 22a–c. The only difference from the panel 16 is that the insert holders 40 are on the adjacent panels 22a and 22b. The folding closure of the package 17 would be the same sequence as the folding of the panels in the package 16. These two options give the publisher the opportunity to provide printed indicia in a center panel, such as the panel 22b of package 16, or at the end panel 22c for the package 17.

FIG. 23 illustrates a package 18 having a four panel arrangement similar to the package 17, but further including a panel 30, as in the package 11, forming a pocket with the panel 22c allowing a pamphlet P, or the like, to be inserted.

A package 19 is depicted in FIG. 24 that shows an alternate embodiment wherein a panel 30 is affixed over the panel 22b and a holder insert 40 is attached to the panel 30 to create a pocket under a CD 70 for a pamphlet P. Accordingly, the package 19 is a modification of the package 11 by providing it with a hinge structure 36 between panels 22a and 22b, and attaching an additional holder insert 40 at the panel 30 to create a three panel double CD package with a pocket.

It will be understood in regard to FIGS. 15–24 that the die-cut sleeves 20 may be printable on any of the exposed panel surfaces—front or back—by utilizing glossy white paperboard coated on two sides. Accordingly, the publisher has a wide variety of options in regard to providing reply cards, printable surfaces, pockets and CD attachment locations.

It will also be appreciated that although the invention has been disclosed with reference to single and double CD packages, it encompasses packages for three or more CD's within its scope. Further, the holder inserts 40 might be made of sufficient thickness so that multiple CDs might be stacked in one deeper holder insert 40. Likewise computer diskettes may be stacked one or more deep within a holder insert 40 by creating corner-shaped configurations for the die-cuts 45, 46, so that the recess 58 would assume a rectilinear general outline, rather than circular. Of course, the formation of the die-cuts 45, 46 could be made in a variety of geometric configurations, and not limited to circular, rectangular or polygonal. When packaging computer diskettes, the hub 60 would not be required and the computer diskettes would be held by die cutting complementary shapes for the flaps 45,46.

ACHIEVEMENTS

Accordingly, a package and methods for making and using the package have been disclosed, which packaging provide high visual appeal, great functionality and, importantly, enhanced mailability by minimizing package weight. The corrugated holder insert 40 for a CD 70 weighs substantially less than one ounce. The package provides a "soft" retention by the utilization of corrugated board and a covering paperboard sleeve or jacket. The utilization of corrugated board in this construction also makes the inventive packaging environmentally desirable by being recyclable. Although the inventive package has significant usefulness as a mailer, it may also be provided for packaging in other types of retail, wholesale, and OEM applications, as would be understood to those in the publishing and packaging arts. While the invention has been described in connection with preferred embodiments for the package, the method of packaging, and the method of making the package, a wide range of equivalents are encompassed in the scope of the claims appended hereto.

What is claimed is:

1. A package for a compact disk having a circumferential edge with a predetermined radius and a central hole; the packaging comprising:

a disk holder made of corrugated board and having a base and overlying flaps, the flaps being opposingly directed and arranged to be spaced adjacent the circumferential edge of a compact disk and being affixed to the base to create a recess adapted to accommodate a compact disk;

a hub centrally attached to the base within the recess and having means for engaging a central hole of a disk; and a paperboard sleeve attached to the disk holder base and having a plurality of foldable panels for enclosing the disk holder within the recess.

2. The package of claim 1 further including a set of parallel hinge lines between the base and each of the flaps.

3. The package of claim 1 wherein there is at least one gap between the flaps defining at least one finger opening to facilitate a manual removal of a compact disk from the package.

4. The package of claim 3 wherein the base has a cutout corresponding to each finger opening to further facilitate a manual removal of a compact disk from the package.

5. The package of claim 1 wherein the corrugated board is thicker than the disk.

6. A package for a disk-shaped article comprising:

a holder made of corrugated board and having a plurality of layers including a base and overlying flaps defining a recess for accommodating a disk-shaped article therein, the recess having a depth at least equal to the thickness of the article to be accommodated;

the flaps are opposingly faced and include surfaces to be article-adjacent upon receipt of a disk-shaped article within the recess;

the article-adjacent surfaces comprise opposing curved edges capable of fitting closely adjacent curved peripheral edges of a disk-shaped article; and a foldable jacket having at least two foldable panels, one panel being attached to the base and another panel capable of foldably enclosing the recess of the holder.

7. The package of claim 6 including means for sealing the package closed.

8. The package of claim 6 wherein the flaps are folded onto and adhered to the base at opposite sides of the base.

9. A method of packaging a compact disk comprising:

providing a disk holder insert made of corrugated board and having a base section and opposingly disposed flaps defining a recess;

providing a paperboard sleeve having a plurality of foldable sleeve panels, at least one of said panels being capable of attachment to the disk holder insert;

attaching the disk holder insert to a foldable sleeve panel;

attaching a resilient hub to a compact disk;

inserting the compact disk into the recess of the disk holder insert and self-centering the resilient hub in the recess;

folding a foldable sleeve panel over the disk holder insert and compact disk therein; and adhering a foldable sleeve panel onto another foldable sleeve panel to sealingly close the package.

10. The method of claim 9 further including the step of printing indicia on an exterior surface of the sealingly closed package.

11. The method of claim 9 wherein the step of adhering a foldable sleeve panel comprises adhering a foldable sleeve panel having a tear strip for unsealing the package.

12. A package for a computer diskette comprising:

a plurality of holders made of corrugated board and having a base and overlying flaps, the flaps having edges opposingly spaced at a distance to accommodate a computer diskette therebetween, the flaps being affixed to the base and creating a recess therebetween having a depth no less than a computer diskette to enable accommodating a computer diskette therein;

a paperboard sleeve attached to the base of each of the plurality of holders at a face of the base opposite the recess, the paperboard sleeve having a plurality of hingedly joined foldable panels for enclosing the recess, the paperboard sleeve further including means for sealing the package closed.

13. The package of claim 12 wherein the recess of the holder has a depth capable of accommodating a plurality of computer diskettes therein.

14. The package of claim 12 wherein the holder has exposed surfaces thereof covered by a paper liner capable of receiving printed indicia thereon.

15. The package of claim 12 wherein the means for sealing the package closed comprises a foldable panel being smaller than the other panels and being pivotally attached at a hinged connection to one of the other foldable panels, the smaller panel having a portion thereof capable of adhesive securement onto another of said foldable panels when pivotally folded about the hinged connection to close the package.

16. A package for a compact disk having a circumferential edge with a predetermined radius and a central hole; the packaging comprising:

a disk holder made of corrugated board and having a base and overlying flaps, the flaps being opposingly directed and arranged to be spaced adjacent the circumferential edge of a compact disk and being affixed to the base to create a recess adapted to accommodate a compact disk;

a paperboard sleeve attached to the disk holder base and having a plurality of foldable panels for enclosing the disk holder within the recess; and the plurality of foldable panels including a tear panel having means for tearing open the package.

17. The package of claim 16 wherein the corrugated board is thicker than the disk.

18. A method of packaging a compact disk comprising:
providing a disk holder insert made of corrugated board and having a base section and opposingly disposed flaps defining a recess;
providing a paperboard sleeve having a plurality of foldable sleeve panels, at least one of said panels being capable of attachment to the disk holder insert;
attaching the disk holder insert to a foldable sleeve panel;
inserting a compact disk into the recess of the disk holder insert;
folding a foldable sleeve panel over the disk holder insert and compact disk therein; and
adhering a foldable sleeve panel having a tear strip for unsealing the package onto another foldable sleeve panel to sealingly close the package.

19. The method of claim 18 wherein the step of folding comprises folding more than one foldable sleeve panel over the disk holder insert and compact disk.

* * * * *